Patented Apr. 19, 1932

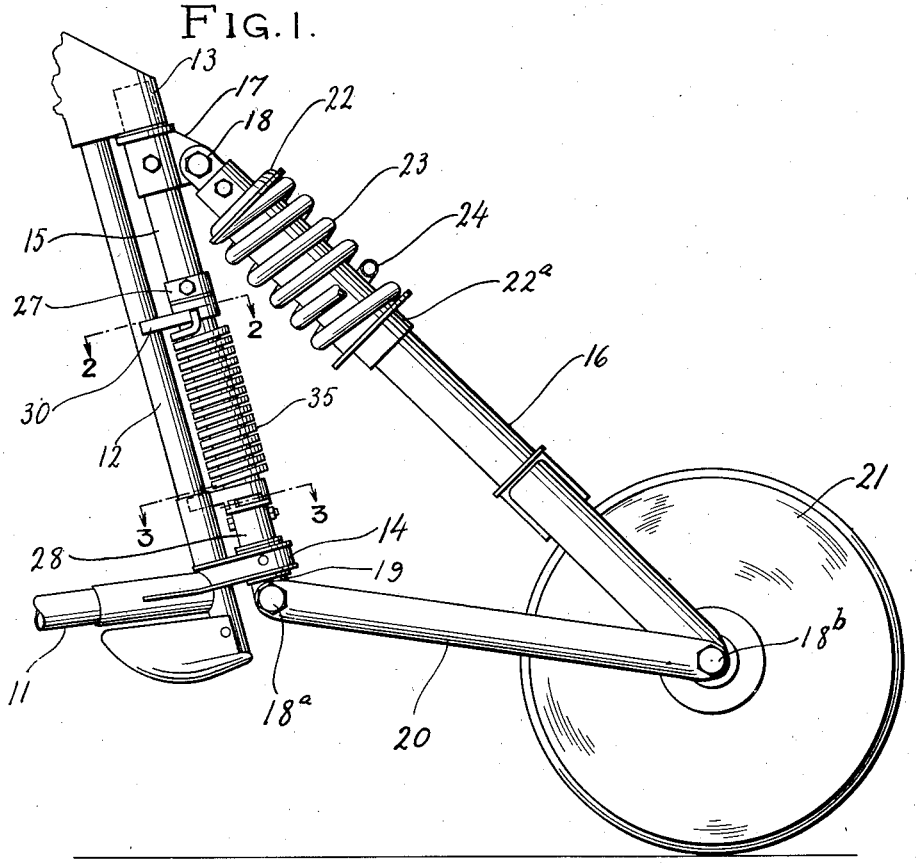
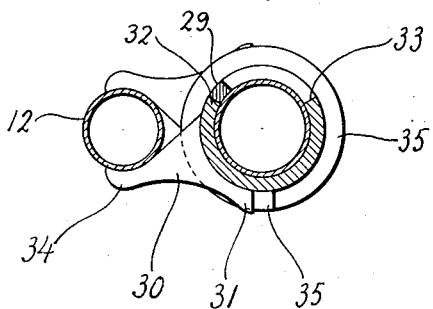
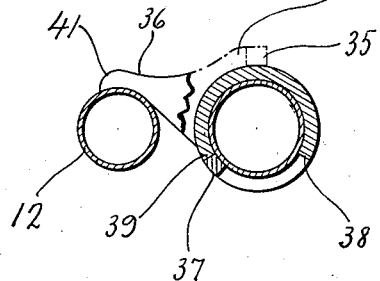

1,855,020

UNITED STATES PATENT OFFICE

KNUT HENRICHSEN, OF GARDEN CITY, NEW YORK, ASSIGNOR TO CURTISS AEROPLANE & MOTOR COMPANY, INC., A CORPORATION OF NEW YORK

AIRCRAFT TAIL CHASSIS

Application filed October 29, 1929. Serial No. 403,178.

This invention relates generally to aircraft and especially to an improved tail chassis suitable for use with aircraft. It is more specifically concerned with means for automatically and resiliently maintaining such a tail chassis at a normal central position and for returning it to such position after it has been displaced therefrom.

Prior to my invention there have been devices provided for the same purpose, but these prior devices usually consisted of a pair of springs connected to spaced points on some part of the tail chassis and also fastened to fixed points on the airplane fuselage in such a way that the two springs pull against each other to maintain the tail chassis in substantially central position. Such devices are subject to several disadvantages. If one spring becomes weaker than the other, the tail chassis is maintained, not in its central position, but to one side thereof toward the stronger spring. Due to the repeated use and variations in the tension imposed upon the springs, it is apparent that, even if the springs are of equal tension when originally adjusted, one of them is apt later to become weakened more than the other.

One of the objects of my invention is to provide means for centering the tail chassis of an aerial vehicle which means will have more equal and uniform action than devices previously used.

A further object is the decrease of weight in the tail chassis of aircraft.

A further object is the decrease in the number of parts of the tail chassis of aircraft.

A further object is such an arrangement of the parts of the tail chassis of an aerial vehicle as to enable the use of a more efficient spring for centering said tail chassis, a torsion spring being used instead of tension springs.

A further object is the provision of a hollow spring for use in absorbing the landing and taxiing shocks of aircraft.

Further objects will be apparent from a reading of the subjoined specification and claims and from a consideration of the drawings.

In order to explain the invention more clearly, one embodiment thereof is shown in the accompanying drawings, in which:

Fig. 1 is a side elevation of the rear portion of an airplane equipped with one embodiment of my invention, with part of one of the springs broken away to show its construction.

Fig. 2 is a horizontal section of the device shown in Fig. 1 taken on the line 2—2 thereof; and Fig. 3 is a horizontal section of the device shown in Fig. 1 taken on the line 3—3 thereof.

In general, the device used in illustration of my invention comprises a tail wheel mounted upon shock absorbing struts. The struts are in turn mounted upon a substantially vertical axis shaft for rotation in a substantially horizontal plane in order that the wheel may follow the airplane in its path across the landing field and in its turns as it is taxiing. The shaft has fixedly secured thereto a pair of collars or rings, each having a shoulder formed therewith. Between these rings there is inserted for free rotation on the shaft a pair of stop members each having a shoulder cooperating with the shoulder of its associated ring and each having a projecting hook for purposes to be described. Between the lugs around the shaft there is also inserted a helical spring in such fashion that its ends bear upon shoulders on the two stop members to urge the hooks on both stop members toward a post which is fixed to the airplane structure substantially parallel to the first mentioned shaft. Thus, upon movement of the wheel in either direction, the spring tends to turn it back to normal.

In the drawings I have shown an arrangement of struts and a landing wheel for absorbing landing and taxiing shocks. Referring specifically thereto, 11 represents a longitudinal element of the fuselage of an airplane. Rigidly secured to the element 11 is a substantially vertical tail post 12. Supported at the opposite ends of the post 12 are journals 13 and 14 which may be, if desired, formed as a part of the fuselage structure. Journaled in the bearings substantially parallel to the tail post 12 is a shaft 15 which serves as an axis for the struts of the tail chassis. The upper strut 16 may be pivotally fastened as at 18 to a fitting 17 rigidly secured to the upper end of the shaft 15 and a lower strut 20 may be likewise pivotally mounted as at 18ª to a fitting 19 secured to the lower end of the shaft 15. The struts 16 and 20 may be each provided at their lower ends with yokes which yokes may be pivotally joined as at the pivot 18ᵇ and may carry upon the pivot 18ᵇ, the landing wheel 21. The strut 16 may comprise telescoping members forming an oleo shock absorber and may have secured to the telescoping members, flanges 22 and 22ª, respectively, between which is inserted a helical compression spring 23. This spring, as shown at 24, may be of the hollow type in order to increase its strength-weight ratio.

I have also provided means for returning the above mentioned parts to their normal central position. Fastened to the shaft 15 intermediate its ends are collars or rings 27 and 28. The collar 27 has a downwardly projecting shoulder 29. A stop member 30 is mounted for free rotation upon the shaft 15 beneath the collar 27. The stop member 30 has cooperating shoulders 32 and 33 designed to cooperate with the shoulder 29 and a shoulder 31 designed to cooperate with a spring 35. It is normally resiliently held with its nose or hook 34 against the tail post 12 by the spring 35, which spring 35 is normally under a slight stress. The spring 35 may be hollow, if desired, and is inserted around the shaft 15 beneath the stop member 30. A similar lower stop member 36 is also loosely rotatable about the shaft 15 and is positioned beneath the spring 35 but above the collar 28. The collar 28 has a stop lug 37 which projects upwardly to cooperate with shoulders 38 and 39 formed on the stop member 36. The spring 35 bears against a shoulder 40 on the stop member 36 and tends to maintain the nose or hook 41 of the stop member 36 against the tail post 12.

In the operation of this embodiment of my improved centering device, the tail chassis is normally held in such a position that the wheel 21 forms a substantially longitudinal continuation of the fuselage of the airplane. However, due to turning of the airplane or irregularities in the ground, or both, the wheel may be resiliently moved to one side or the other, rotating with the shaft 15 in the journals 13 and 14. Upon movement of the wheel 21 to the left (looking forward) it is evident that the stop member 36 will be moved away from the tail post 12 by reason of the rotation of the collar 28 and its upstanding lug 37 with the shaft 15, and by reason of the contact of the lug 37 with the shoulder 39 of the stop member 36. This moves the lower end of the spring 35 clockwise looking down, and as the upper end of the spring 35 abuts against the shoulder 31 of the stop member 30 and the nose 34 of the stop 30 is held against movement by the tail post 12, the spring 35 is placed under greater stress and there is a tendency as soon as the force moving the wheel 21 is removed, to return the wheel to its original position. In the same way, if the wheel is turned to the right, the stop 30 moves away from the post 12 and the stop 36 being held by the tail post 12, the spring 35 is similarly placed under tension and when released, tends to move the wheel back toward its normal position.

It is to be understood that the above described embodiment of the invention is for the purpose of illustration only and various changes may be made therein without departing from the spirit and scope of the invention.

I claim as my invention:

1. In a tail chassis for airplanes, means for absorbing landing shocks, pivotally mounted upon a part of the airplane, and means for yieldingly urging the absorbing means to a normal central position, said last named means comprising a single spring, a shaft upon which the absorbing means is pivoted, and a pair of floating lugs rotatively mounted upon said shaft.

2. In a tail chassis for airplanes, means for absorbing landing shocks, pivotally mounted upon a part of the airplane, and means for yieldingly urging the absorbing means to a normal central position, said last named means comprising a single spring, a shaft about the axis of which the absorbing means is pivoted, a pair of floating lugs rotatively mounted upon said shaft, and a pair of stationary lugs fixed to said shaft.

3. In a tail chassis for airplanes, means for absorbing landing shocks, pivotally mounted upon a part of the airplane, and means for yieldingly urging the absorbing means to a normal central position, said last named means comprising a shaft about the axis of which the absorbing means is pivoted, a pair of floating lugs rotatively mounted upon said shaft, a pair of stationary lugs fixed to said shaft, and a helical spring surrounding said shaft and having its opposite ends bearing upon the rotatable lugs.

4. In a tail chassis for an airplane; a substantially upright member firmly secured to the framework of the airplane; a pair of spaced bearings secured to said upright member; a shaft carried in said bearings in substantially parallel relationship with the upright member; a strut secured to the lower end of said shaft; a resilient strut secured to the upper end of said shaft; a tail wheel supported by the lower ends of said struts; a pair of lugs secured to said shaft; each of said lugs being provided with a shoulder; a pair of floating lugs mounted on said shaft for substantially free rotation thereon and each having a pair of shoulders, one of each pair being adapted to cooperate with the shoulder of one of the fixed lugs; and a spiral spring having one end bearing against a shoulder formed on one of the floating lugs and the other end bearing against a shoulder formed on the other floating lug; each of the floating lugs having a projection adapted at times to contact with said upright member.

5. In a tail chassis for airplanes, means for absorbing landing shocks pivotally mounted upon a part of the airplane, and means for yieldingly urging the absorbing means to a normal central position, said last named means comprising a shaft upon which the absorbing means is pivoted, and a single torsion spring encircling said shaft.

In testimony whereof I hereunto affix my signature.

KNUT HENRICHSEN.